United States Patent Office

3,136,818
PRODUCTION OF ANILINE
Heinrich Sperber and Guenter Poehler, Ludwigshafen (Rhine), Hans Joachim Pistor, Mannheim, and Anton Wegerich, Limburgerhof, Germany, assignors to Badische Anilin- & Soda-Fabrik Aktiengesellschaft, Ludwigshafen (Rhine), Germany
No Drawing. Filed Jan. 10, 1961, Ser. No. 81,678
Claims priority, application Germany Jan. 15, 1960
4 Claims. (Cl. 260—580)

This invention relates to improvements in a process for the production of aniline by catalytic hydrogenation of nitrobenzene in a fluidized layer.

It is known to produce aniline by catalytic hydrogenation of nitrobenzene. Since the reaction proceeds strongly exothermically, considerable difficulty is experienced in maintaining a uniform reaction temperature in the reaction chamber. Attempts have been made to overcome the said difficulty by using a large excess of hydrogen in order to lead away the heat. This measure, however, does not prevent resinification on the catalyst and consequently the activity of the catalyst subsides in a short time. Cooling means arranged within the catalyst chamber have diminished this disadvantage without obviating it. It has also been proposed to carry out the reaction in a fluidized layer. In this way the throughput can be increased, the nitrobenzene introduced in the liquid state and the regeneration period of the catalyst shortened, but on the other hand the rapid fall in activity of the catalyst cannot be avoided solely by the use of a fluidized layer because when liquid nitrobenzene is introduced at the lower end of the vessel, the temperature in the vessel falls by reason of rapid vaporization of the initial material and then considerable evolution of heat occurs as a result of the exothermic reaction, and gradual resinification.

It is an object of the present invention to provide a process for the catalytic hydrogenation of nitrobenzene to aniline in which the use of a large excess of hydrogen is unnecessary. Another object of the invention is a process for the catalytic hydrogenation of nitrobenzene to aniline in which resinification of the catalyst is substantially precluded and consequently a prolonged life of the catalyst is brought about.

These and other objects are achieved by carrying out the catalytic reaction of nitrobenzene with hydrogen to form aniline in a vessel which is provided with cooling means and in which the catalyst forms a fluidized layer, at normal or increased pressure, and introducing the initial material to be hydrogenated at a plurality of places at different heights of the vessel and introducing the hydrogen necessary for the hydrogenation together with the initial material and/or at the bottom of the vessel.

Carrying out the catalytic hydrogenation of nitrobenzene in a fluidized layer by the method according to this invention leads to a practically complete reaction of the nitrobenzene with a very long life of the catalyst before it needs regeneration, and a very long total life. The life of the catalyst until it needs regeneration is that time which elapses before regeneration is necessary, taking into account the amount of nitrobenzene reacted during this period. The total life of the catalyst is that time which results from the sum of all the lives of the catalyst until it needs regeneration, i.e., the total time for which the catalyst can be used until regeneration can no longer be successfully carried out. In carrying out the process industrially, both the life until regeneration is necessary and the total life are important. The period until regeneration is necessary determines the frequency of regeneration. The total life is important for the frequency of catalyst replacement.

The catalytic hydrogenation of nitrobenzene to aniline is effected by leading a mixture of hydrogen and nitrobenzene over the catalyst present in the fluidized bed at the reaction temperature. The molar ratio of hydrogen to nitrobenzene should be at least 3:1. We prefer a molar excess of hydrogen of at least 20%, advantageously 50–400%, especially 50–250%. The nitrobenzene is introduced in liquid or partly vaporized form together with the hydrogen. In accordance with the invention, the initial material is introduced into the fluidized layer at a plurality of points at different heights of the layer. Depending on the size of the reaction chamber and the height of the fluidized layer, the initial material may be introduced at two, three, four or more different heights, and introduction may be effected, for example, through nozzles. Nitrobenzene and hydrogen are preferably introduced through the nozzles at a molar ratio of from 1:1 to 1:3.1. The distance between inlets measured vertically should be at least 0.3 meter, especially 0.5 to 1.0 meter. In the case of very high fluidized layers, the distance may be several meters. If the diameter of a reaction space is comparatively large, a plurality of inlets is provided at the same height. They are so arranged that their distance is at least 0.3 meter from one another. It is convenient to distribute the inlets over the lower three-quarters of the fluidized bed. It is advantageous to use for the introduction, two-component nozzles which permit the simultaneous introduction of nitrobenzene and hydrogen or hydrogen-containing gas. The fluidized condition is maintained by means of gas introduced from below. It is possible to use inert gases, as for example nitrogen, but it is preferable to use for this purpose the waste gases which still contain hydrogen, after separating water, and part of the hydrogen necessary for the reaction. It is also possible, however, to introduce part of the nitrobenzene with the flowing gases from below into the fluidized bed. Or the whole amount of hydrogen can be introduced from below and the nitrobenzene alone introduced into the fluidized layer at the different heights.

The velocity of the gases in the fluidized layer lies between 0.1 and 1.5 meters per second, especially 0.2 to 1.0 meter per second. The preferred velocity depends on the capacity of the catalyst for being fluidized. It is advantageous to use globules or grains having a diameter of about 0.05 to 0.5 mm., especially 0.15 to 0.4 mm.

The process may be carried out under normal pressure, but it is advantageous to apply increased pressure. Pressures of more than 4, especially 5 to 10 or more, e.g., 10 to 25 atmospheres, are preferred. Higher pressures, for example 100 to 300 atmospheres, may also be used. When working under pressure and with loads in excess of 0.5 kg. per liter of catalyst per hour, velocities between 20 and 80 cm. per second are sufficient. Moreover, working under pressure prolongs catalyst life. When working under pressure and with high loads, it is advantageous to use a sufficient molar excess of hydrogen, for example of 100–250° in order to avoid strong variations in the flow speed within the reaction chamber.

Suitable catalysts include heavy metals of groups I, V, VI and VII of the periodic system as well as of the iron and platinum group, for example copper, tungsten, molybdenum, nickel, cobalt or mixtures of these elements, as well as their oxides, sulfides or halides, possibly together with boron or boron compounds. Examples of suitable mixtures are cobalt molybdate and nickel wolframite. They may be applied to carriers, such as alumina, natural or synthetic silicates of aluminum, magnesium, zinc, iron, manganese, or titanium, pumice, iron oxide, magnesia, zinc oxide, zirconium oxide, titanium oxide, throium oxide or mixtures thereof. The carriers may be treated with bromine, iodine, fluorine or chlorine. It is preferred, especially when carrying out the process under pressure, to use catalysts applied to silicic acid or silicate carriers which have a surface of more than 40 square meters per gram and a pore diameter of more than 20 A., and also catalysts on alumina carriers which have an average pore diameter between 20 and 1000 A. The production of these catalysts is known and is not a feature of the present invention.

The catalyst is reduced with hydrogen at about 200° C. at the beginning of the process. The catalyst remains in the vessel and is regnerated by heating in a stream of air after a long period, for example after some weeks. However, it is also possible to withdraw part of the catalyst continuously or periodically and to replace it by fresh and/or regenerated catalyst so that the process can be carried out continuously.

The gas can be passed through the vessel at a high velocity so that part of the catalyst is always withdrawn and can be cooled and returned. Part of this amount of catalyst can be replaced by fresh or regenerated catalyst prior to its return.

The reaction temperature is kept between 200° and 400° C., preferably between 250° and 300° C. A tube nest containing a heat-absorbing liquid is provided in the vessel for heat withdrawal. For example steam may be produced in the tubes in this way. The vessel walls may similarly be provided with a cooling jacket.

The throughput of nitrobenzene is from 0.1 to 10, especially 0.2 to 3, kilograms per liter of catalyst volume per hour. Regeneration of the catalyst is necessary after 300 hours, for example with a catalyst consisting of copper applied to silicic acid at a throughput of about 150 kilograms of nitrobenzene per kilogram of catalyst because after this period of small amount of nitrobenzene, about 0.1%, appears in the reaction product. When using other catalysts, other catalyst lives are achieved. In all cases, however, the life obtainable by the process according to the present invention is longer than when the initial materials are introduced into the fluidized layer exclusively from below or from below and laterally at only one point. Alkylated nitrobenzenes, such as nitrotoluene or nitroxylene, may also be used as initial materials.

The invention is illustrated by but not limited to the following examples.

*Example 1*

A vertical reaction vessel consisting of a cylindrical tube 5 meters in height and having a diameter of 200 mm. is charged with 75 liters of a catalyst which consists of active alumina with 10% of copper and has a mean grain size of 0.3 mm. The catalyst is supported by a grate through which 12 cubic meters (S.T.P.) per hour of hydrogen are introduced, the grains of catalyst thus being fluidized. Three nozzles are uniformly distributed at distances of 1, 2 and 3 meters from the bottom of the vessel and through each of these 25 kilograms of liquid nitrobenzene flow together with 14 cubic meters (S.T.P.) of hydrogen. The injection nozzles are arranged so that the nitrozenzene with the aid of hydrogen passes into the vessel as a fine mist. An evaporator tube fed with water is situated in the vessel and withdraws the reaction heat of about 900 Kcals per kg. of nitrogen, thus making possible the maintenance of a reaction temperature of 275° C. When the activity of the catalyst subsides, the temperature is gradually raised to about 400° C. When the first traces of nitrobenzene appear in the aniline, the catalyst is regenerated with air and then reduced in a current of hydrogen at 250° C. Regeneration can be carried out ten times. The vapors and gases leaving the reaction vessel are passed through a water cooler to a separating vessel. Separation of gases from liquid takes place therein. An aniline free from nitrobenzene is obtained in a purity of 99.5%. The gas containing hydrogen is returned.

Instead of active alumina, magnesium oxide may be used in a similar manner.

*Example 2*

To carry out the reaction, a cylindrical reaction vessel is used having a diameter of 1.2 meters and a height of 8 meters in the lower end of which a grate is provided to ensure uniform distribution of the circulating gas supplied to the vessel from below. A cyclone is provided in the upper part of the vessel to separate entrained catalyst. The reaction vessel contains 4 cubic meters of catalyst. The catalyst consists of particles having a diameter of 0.2 to 0.3 mm. and has the composition 15% copper, 0.3% chromium, 0.3% barium and 0.3% zinc which are present as oxides and are applied to precipitated silicic acid, heated to 400° C., as carrier. The vessel has twelve two-component nozzles arranged in groups of three at different heights of the vessel. The first group are situated immediately above the grate and the second to fourth groups are 70, 140 and 210 cms. above the grate, i.e., at one-fifth, two-fifths and three-fifths of the height of the quiescent catalyst bed.

At the beginning, the catalyst is reduced, the air first being driven out from the reaction vessel by introducing nitrogen and then the catalyst being reduced with hydrogen at a temperature between 200° and 250° C. After reduction of the catalyst, the working pressure in the vessel is adjusted to 5 atmospheres gage and then the injection of liquid nitrobenzene through the two-component nozzles in finely divided form is begun with the aid of the amount of hydrogen necessary for the reduction, namely 3.1 mols per mol of nitrobenzene. 2000 kg. of nitrobenzene and 1120 cubic meters (S.T.P) of fresh hydrogen are supplied per hour with the aid of a pump to the two-component nozzles in uniform distribution. A pressure of 5 atomspheres gage is maintained in the reaction chamber. The reaction gas leaves the vessel through the said cyclone and passes through a heat exchanger into a separating vessel in which the aniline formed and the water are separated from the gas. The latter is returned through a preheater to the process with the aid of a circulating pump. 2400 cubic meters (S.T.P.) per hour of circulating gas are supplied to the vessel below the distributor grate.

Cooling tubes parallel to the vessel wall and at a distance of 30 cm. therefrom are arranged in the lower two-thirds of the quiescent catalyst layer. These make it possible to maintain a temperature of 280° to 290° C. 1700 kg. of water per hour are recovered in the cooling system in the form of steam at 12 atmospheres gage. 1510 kg. per hour of aniline are obtained in the separator (i.e., 99.5% of the theoretical yield) and 580 kg. of water. By simple distillation it is obtained with a purity of nearly 100% and a content of nitrobenzene of less than 0.01%. It is only after an operational period of more than 300 hours that the nitrobenzene content of the aniline reaches 0.05%. The original activity of the catalyst can be restored by regeneration with air at 350° C. and subsequent reduction in the way described above. The total life of the catalyst is 4 months.

Similar results are obtained by using 7% of nickel instead of copper and 10% of molybdenum instead of chromium, barium and zinc.

*Example 3*

A globular catalyst consisting of active alumina to which 18% of copper have been applied is placed in a cylindrical reaction vessel having a diameter of 2 meters. Eleven nozzles are arranged in the layer of catalyst in the following way. At a height of 0.5 meter above the grate four nozzles are situated, after another 0.5 meter another four nozzles and after a further 0.5 meter three nozzles. Through these nozzles, 800 kg. of liquid nitrobenzene per hour together with 1400 cubic meters (S.T.P.) of a gas containing 90% of hydrogen are introduced in uniform dispersion. Below the grate, 13,000 cubic meters (S.T.P.) of circulating gas consisting of 50% of $H_2$ hydrogen and 50% of $N_2$ nitrogen are introduced together with 800 liters of vaporized nitrobenzene. The reaction pressure is 10 atomspheres gage. A cooling system is provided in the fluidized bed and this maintains the temperature at 300° C. The vapors escape at the upper end of the reaction vessel, pass through a heat exchanger in which they give up their heat to the circulating hydrogen-containing gas and pass into a separating vessel. The bulk of the hydrogen-containing gas is returned, a certain percentage being withdrawn in order to maintain an $H_2$ concentration of 50% in the circulating gas.

Aniline is obtained in a yield of 99.5%. The life of the catalyst before it needs regeneration is 400 to 600 hours and the total life is 7 months.

What we claim is:

1. In a process for the production of aniline by hydrogenation of nitrobenzene with a substance selected from the class consisting of hydrogen and a hydrogen-containing gas in the presence of a catalyst in a fluidized layer, the improvement of introducing the initial material to be hydrogenated in at least partly liquid phase into the fluidized layer at a plurality of points at least some of which are at different heights and are separated from each other by a vertical distance of at least 0.3 meter.

2. In a process for the production of aniline by hydrogenation of nitrobenzene with a substance selected from the class consisting of hydrogen and a hydrogen-containing gas in the presence of a catalyst in a fluidized layer, the improvement of introducing at least part of the nitrobenzene together with at least part of the hydrogen necessary for the hydrogenation at a plurality of points, at least some of which are at different heights in the fluidized layer and are separated from each other by a vertical distance of at least 0.3 meter.

3. In a process for the production of aniline by hydrogenation of nitrobenzene with a substance selected from the class consisting of hydrogen and a hydrogen-containing gas in the presence of a catalyst in a fluidized layer, the improvement of introducing at least some of the nitrobenzene at a plurality of points, at least some of which are at different heights in the fluidized layer and are separated from each other by a vertical distance of at least 0.3 meter, and introducing the hydrogen necessary for the hydrogenation at the bottom of the vessel.

4. A process as claimed in claim 1 which is carried out under a pressure of from 7 to 25 atmospheres.

References Cited in the file of this patent

UNITED STATES PATENTS 2,432,087    Brown  ---------------- Dec. 9, 1947

OTHER REFERENCES

"Fluid-Bed Catalyst-Solid Base for Boosting Aniline Output Efficiency," Chemical Week, vol. 85, Sept. 1959, pages 68–70 and 72; 4 pages.

UNITED STATES PATENT OFFICE
CERTIFICATE OF CORRECTION

Patent No. 3,136,818 June 9, 1964

Heinrich Sperber et al.

It is hereby certified that error appears in the above numbered patent requiring correction and that the said Letters Patent should read as corrected below.

Column 2, line 56, for "100-250°" read -- 100-250% --.

Signed and sealed this 10th day of November 1964.

(SEAL)
Attest:

ERNEST W. SWIDER
Attesting Officer

EDWARD J. BRENNER
Commissioner of Patents